UNITED STATES PATENT OFFICE.

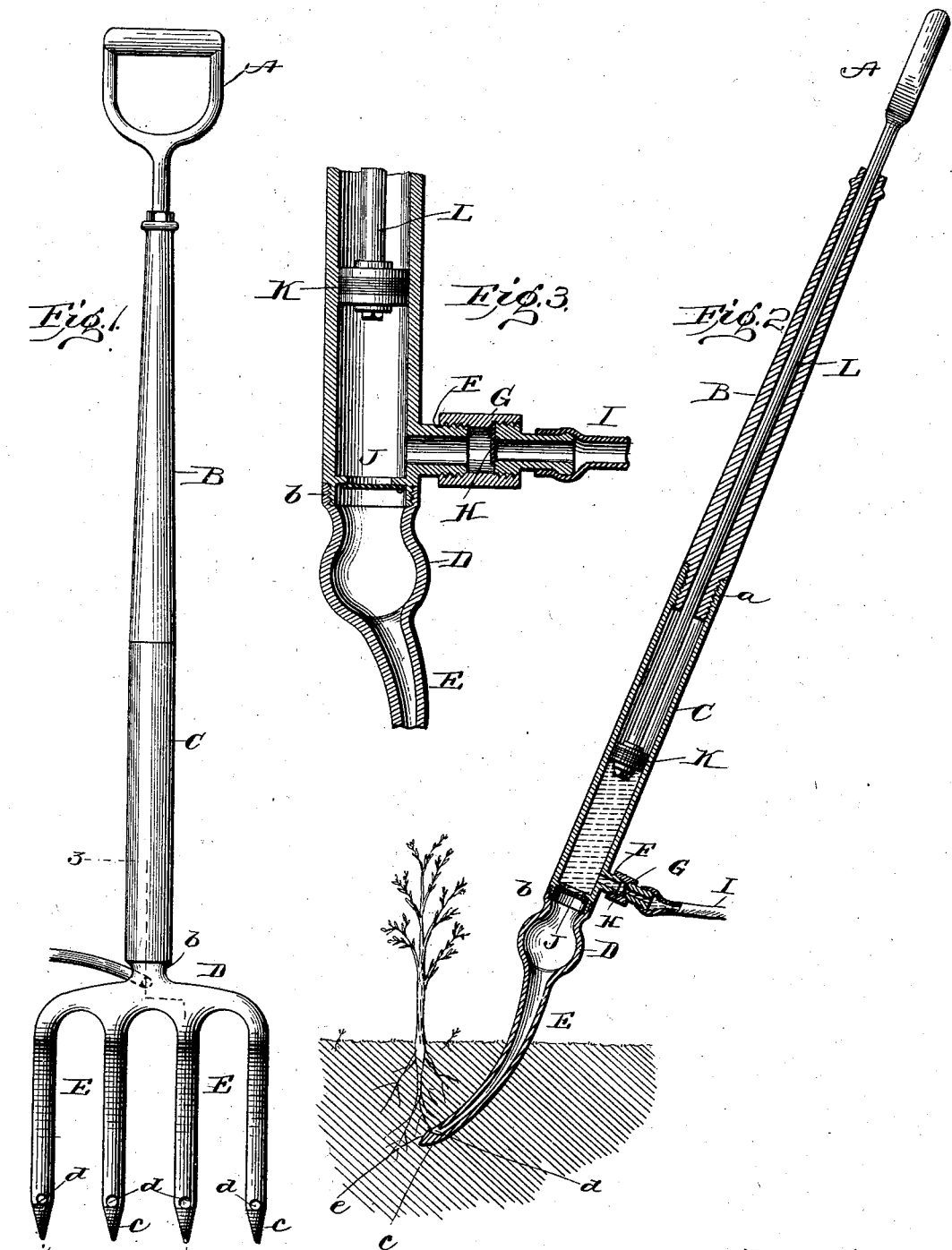

JOHN F. CHASE, OF ST. PETERSBURG, FLORIDA.

PORTABLE IRRIGATOR.

SPECIFICATION forming part of Letters Patent No. 708,126, dated September 2, 1902.

Application filed June 11, 1901. Renewed July 19, 1902. Serial No. 116,244. (No model.)

*To all whom it may concern:*

Be it known that I, JOHN F. CHASE, a citizen of the United States, residing at St. Petersburg, in the county of Hillsboro and State of Florida, have invented certain new and useful Improvements in Portable Irrigators; and I do declare the following to be a full, clear, and exact description of the invention, such as will enable others skilled in the art to which it appertains to make and use the same.

This invention relates generally to irrigating devices, and particularly to hand implements adapted for cultivating plants, as well as for irrigating the same; and it has for its object to provide a simple, durable, and comparatively inexpensive implement of the character named adapted to apply an irrigating or fertilizing liquid to the roots of the plant and also to cultivate the same; and it consists of the parts and combinations of parts hereinafter described and claimed.

In the accompanying drawings, Figure 1 is a front elevation of my improved implement; Fig. 2, a longitudinal vertical section through the same, showing the implement in position for use; and Fig. 3, an enlarged detail vertical section on the line 3 3, Fig. 1, showing the valves and surrounding parts of the implement.

Similar letters refer to similar parts throughout all the views.

The staff of my improved implement consists of the upper tubular section B, having one end reduced and screw-threaded, as at $a$, so as to secure it to the lower tubular section C, which is suitably internally threaded to receive said end $a$. The section B is preferably of wood, while the section C is of metal; but any suitable or desired material may be employed for either section.

To the lower end of section C is secured the hollow fork-head D, the tubular tang $b$ of which is internally threaded to fit the end of said section C. From the fork-head D the tines E extend in slightly-curved lines and terminate in the thickened, tapered, solid points $c$, which serve the double purpose of rendering the insertion of the tines in the earth easy and also of protecting the openings $d$, which are formed in the front faces of the tines, from filling or being clogged with gravel or dirt. As best shown in Fig. 2, the solid ends of the tines at their front sides or faces project beyond the line of the tines, forming a shoulder-like projection $e$, so that the said pointed ends make a hole when they are driven into the earth of slightly-greater diameter than the body of the tines, the wall of which stands slightly beyond the mouth of the opening $d$, thus insuring against the earth filling or clogging said openings.

At the rear side of the section C of the staff a threaded nipple F projects, to which is secured the coupling-tube G of a valve H, to which may be connected a flexible pipe or hose I.

Located within the lower end of section C is a flap-valve J, adapted to open downwardly, and within the tubular section C a piston K, mounted on a rod L, operates, said rod extending through section B and being provided with a handle A, whereby it may be operated. The handle A is formed, preferably, of loop form and serves also as a handle for the staff of the implement.

The pipe or hose I may be connected to any suitable source of supply, such as a stationary reservoir containing the liquid it is desired to use, and the hose to be of such a length that the implement may be carried to the point or points where it is desired to use the same, or the hose may be connected to or inserted in a barrel or other receptacle mounted on a vehicle for transportation or it may be inserted in a pail and the latter carried by hand.

In using the implement as an irrigator or for fertilizing purposes the tines are driven into the earth at the base of the plant. The piston is then drawn upward in the section C by means of the handle A, which causes the valve H to open and the liquid to be drawn into the section C. Downward pressure on the handle closes the valve H and opens the valve J and forces the liquid through the tines and out through the openings $d$ (see Fig. 2) in fine streams or sprays among the roots of the plants. When the implement is to be used as a cultivator, the hose is disconnected from the nipple and the implement used in a manner similar to a digging fork or spade.

Having thus described my invention, what

I claim as new, and desire to secure by Letters Patent, is—

1. A portable irrigator comprising a hollow staff, a piston, a rod for operating the piston, means for connecting the staff with a liquid-supply, a valve for cutting off the supply, hollow tines having lateral openings connected to said hollow staff, and a valve for closing communication between said tines and staff.

2. A portable irrigator, comprising a hollow staff suitably connected with a liquid-supply, valves for controlling the admission to and emission from the staff of the liquid, a hollow fork-head having hollow tines formed with openings secured to said staff, and a piston for drawing the liquid into and discharging the same from the staff through tines.

3. A portable irrigator, comprising a hollow staff, a hollow fork-head having hollow tines formed with perforations and having thickened pointed ends, means for connecting said staff with a liquid-supply, and a piston for drawing the liquid into and discharging the same from said hollow staff.

In testimony whereof I affix my signature in presence of two witnesses.

JOHN F. CHASE.

Witnesses:
H. R. HOWENSTEIN,
M. L. SPELLMAN.